Figure 1:
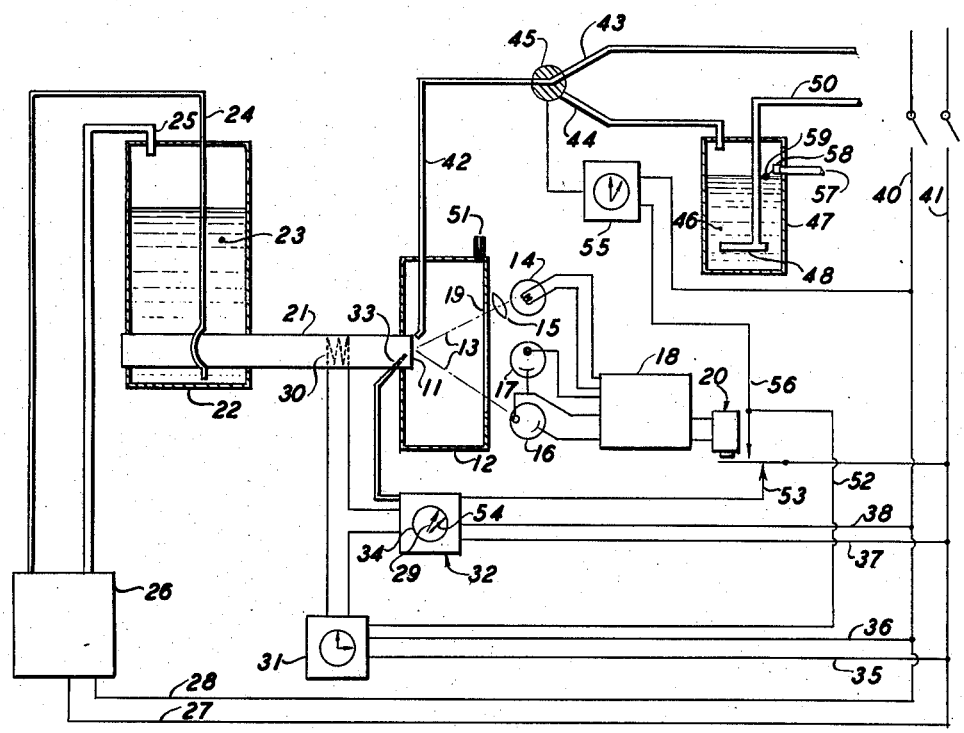

July 7, 1959 E. G. DE CORIOLIS ET AL 2,893,237
DEW POINT INDICATOR
Filed May 11, 1955

INVENTOR.
E. G. DE CORIOLIS
R. HANNA
BY A. W. PETERS

Charles S. Haughey
ATTORNEY

2,893,237
DEW POINT INDICATOR

Ernest G. de Coriolis, Ralph Hanna, and Arthur W. Peters, Toledo, Ohio, assignors to Surface Combustion Corporation, Toledo, Ohio, a corporation of Ohio Application May 11, 1955, Serial No. 507,544

7 Claims. (Cl. 73—17)

This invention relates to a method of cleaning a mirror and more specifically to the automatic removal of residue deposited on a mirror from sample gases whose dew points are determined in a dew point instrument containing the mirror. Such a device is used in connection with gas generators or gas atmosphere furnaces for determining the dew point of the produced or contained gas. It has been discovered that such dew points are indicative of the constituents of the gas and through this knowledge various conclusions may be drawn or automatic controls devised.

As an example of this, a methane containing gas is frequently used as an atmosphere in a carburizing furnace. The gas is produced by an endothermic catalytic reaction of air and natural or various types of artificial gas often enriched with more of the gas. The resulting product may have constituents of approximately 40% $N_2$, 20% $CO$, 39% $H_2$ and 1% $CH_4$ depending on the ratio of the air-gas mixture and the type of gas used. This gas is then emitted under a slight pressure to a gas tight furnace chamber which encloses the work to be treated. By this process two effects result. Air is excluded from the heating chamber, thus preventing oxides or scale from forming on the work. Secondly, the gas supplies carbon for a carburizing reaction with the work. This carbon diffuses into the work according to the temperature of the chamber, length of time the work is heated, and amount of carbon already present in the work.

The gas reacts with iron in the work as follows:

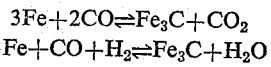

As noted, the reaction is reversible and, furthermore, quickly comes to equilibrium according to the amount of carbon dioxide and water vapor formed. To continue this reaction methane is added to this atmosphere gas which reacts with the carbon dioxide and water according to:

$$CH_4 + CO_2 \rightarrow 2CO + 2H_2$$
$$CH_4 + H_2O \rightarrow CO + 2H_2$$

Thus additions of methane decrease the carbon dioxide and water vapor and allow the carburizing reactions to continue.

It may be seen from the first reactions that carbon dioxide and water vapor are the limiting factors in the carburizing process. The amount of $CO_2$ may be determined from the amount of water vapor since:

$$K = \frac{CO \times H_2O}{CO_2 \times H_2}$$

The amount of carbon monoxide and hydrogen in the atmosphere gas are substantially constant. Therefore, the amount of water vapor, and hence the carburizing potential of the gas, may be simply determined by taking the dew point of this gas.

Various dew point instruments are commercially available. A common type utilizes a mirror with a beam of light reflected from it to a light sensitive cell. A stream of the gas whose dew point is desired is directed toward the face of the mirror which is cooled until the dew point is reached. At that point, fog is formed on the mirror from the moisture in the gas, and the intensity of the light beam reflected from the mirror toward the cell is reduced. The cell, connected in a suitable electric circuit, then causes the temperature of the mirror, which is the dew point, to be indicated or recorded. The mirror is then heated to dissipate the fog and the process is repeated.

It has been found that when the fogging occurs and sometimes prior to fogging, condensible contaminants from the gas also deposit on the mirror. These are generally tarry substances in vapor form that evaporate more slowly than water vapor. Thus, when the mirror is heated, such deposits are not fully evaporated and a film remains on the mirror. This gradually builds up until erroneous dew points result from the dirty surface. The mirror must then be manually cleaned. In actual practice, this must be accomplished as frequently as every two hours depending on the amount of contaminants in the gas tested.

To overcome this disadvantage it has been discovered that if the mirror is subjected to a stream of moist gas after fogging and the mirror is heated above the dew point, the contaminant deposits will be disposed of. The amount of moisture of solvent in the gas is not critical except that there must be a sufficient amount to cause the dew point of this mixture to be equal to, or higher than, the dew point of the gas being tested. This requirement is necessary to allow moisture from the mixture to condense on the mirror when fogged.

Furthermore, enough moisture should be deposited to dissolve the contaminants but not a sufficiently superfluous amount that will require a prolonged heating period to evaporate it. This amount depends on the amount of moisture content of the moisture containing gas, the dew point of the gas tested, and the period of time the moisture containing gas is emitted to the mirror. A shorter cycle may be attained by emitting a substantially saturated gas to the mirror for a short period of time rather than emitting a drier gas for a longer period. In the aforementioned case where the dew point of the tested gas is in the range of 15° to 25° F., a moisture containing gas substantially saturated by bubbling it through the liquid at room temperature is emitted to the mirror for two seconds. The mirror is then heated to 80° F. for two minutes to evaporate the solution of contaminants and moisture. When the sample gas is emitted to the mirror during the heating period, the mirror need not be heated above the dew point of the cleaning gas but only above the dew point of the sample gas since it will then be able to absorb the deposited moisture. This process has eliminated the necessity of manually cleaning the mirror for periods in excess of two months.

For further consideration of what we consider novel and our invention refer to the drawing, specification, and claims.

Figure 2:
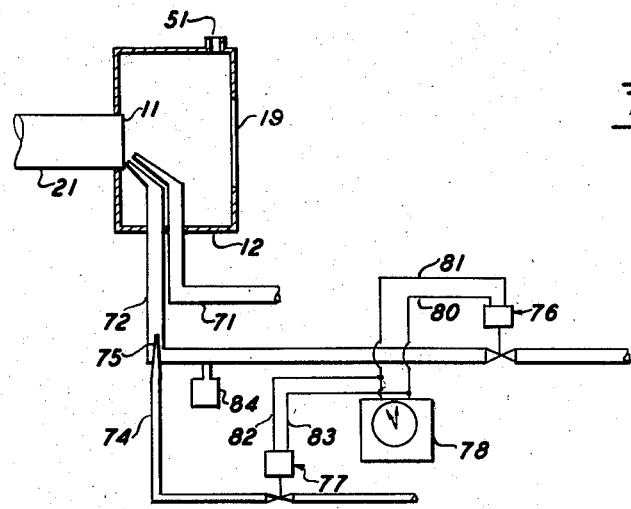

In the drawing:

Figure 1 shows a schematic diagram of a dew point recorder embodying a preferred form of our invention and Figure 2 illustrates another form of our invention.

The present invention provides apparatus for automatically controlling the dew point in a plurality of zones in a furnace. Included are a light source and two phototubes, one of which receives light directly from the light source and the other receives light reflected from a mirror. An amplifier is connected to the two phototubes and the amplifier actuates a relay. The mirror has a metal rod integrally connected to the back of it which extends into a container containing refrigerant covering a portion of the rod. A refrigerating means supplies the refrigerant. A thermocouple is located adjacent the back of the mirror and is connected to an instrument capable of indicating the temperature of the thermocouple. A heating element is located in the rod between the refrigerant and the mirror with a timer controlling the length of time the element is heated and the aforementioned instrument controlling the temperature to which the element is heated. A conduit connected to a valve is directed toward the mirror, a second conduit connects the valve to a gas source, a third conduit connects the valve to the upper portion of a second container, and a fourth conduit connects the bottom of the second container to a gas source. Means are provided for filling the bottom portion of the second container with liquid. A timer controls the aforementioned valve and connecting means are included for controlling the instrument and timers by the relay.

A mirror 11 in dew chamber 12 reflects light, indicated by lines 13, from light source 14 through focusing lens 15 and to phototube 16. A balancing phototube 17 receives light directly from light source 14 and the difference between the two phototubes' current is amplified by amplifier 18 to actuate relay 20. The use of the balancing phototube 17 compensates for light intensity variation produced in light source 14 due to current variation or aging of components. This is explained in Patent Number 2,593,313 to Kamm and Sico.

Mirror 11 is the highly polished chrome plated end of a copper rod 21. The rod extends through container 22 which contains refrigerant 23 entering through capillary feed tube 24 and exiting through conduit 25. These are connected to a suitable refrigerating system 26 connected to a power source by leads 27 and 28.

A heating element 30, preferably inserted in a slot in rod 21, interrupts the cooling of mirror 11 when desired by supplying heat between the refrigerant 23 and the mirror 11. This element is supplied current for a period of time as set on timer 31 and is further controlled by a temperature limit as set by pointer 29 on a recording potentiometer 32. This instrument also indicates the temperature of mirror 11 by means of a thermocouple 33. Furthermore, such temperature is recorded when the dew point is reached on a slowly revolving paper disc 34 located on the face of potentiometer 32. Power is supplied to timer 31 and potentiometer 32 by leads 35 and 36 and leads 37 and 38 respectively which are connected to a power line 40—41.

Gas is supplied to chamber 12 through conduit 42 from conduit 43 or 44, selectively controlled by a relay valve 45. Gas supplied to conduit 43 is the test gas whose dew point is to be determined. Gas supplied to conduit 44 is first bubbled through liquid 46 in the lower portion of container 47 by means of a distributor 48 connected to conduit 50. A vent 51 allows the gas emitted to chamber 12 to escape.

The liquid 46 is kept at a constant level in the lower portion of container 47 by means of a pipe 57 connected to a water supply (not shown). The flow of water is controlled by a valve 58 and float 59.

In the operation of this instrument, mirror 11 is cooled through rod 21 by refrigerant 23 with test gas emitted to it by conduits 42 and 43. As the dew point of this gas is reached the mirror becomes fogged, thus decreasing the intensity of the light reflected to phototube 16 from light source 14. This actuates relay 20 through amplifier 18.

Relay 20 then resets timer 31 through line 52. This allows current to flow through heating element 30 and the temperature of mirror 11 begins to rise. The relay 20 also opens the balancing motor circuit in potentiometer 32 by means of line 53 which causes the temperature of mirror 11 to be recorded on paper disc 34 by a pen 54. A third action caused by relay 20 is to start a timing period in timer 55 by means of line 56. This timer automatically resets itself when the end of the timing period is reached. During the timing period, the relay valve 45 is actuated to cause the moisture containing gas from conduit 44 to be supplied to conduit 42.

As the mirror temperature rises the fog dissipates and relay 20 again returns to its normal position. Timer 31 then begins its timing cycle with current still supplied to element 30 but controlled in an on-off manner by the temperature limit set on potentiometer 32. This occurs until timer 31 completes its timing cycle and the mirror again begins to cool.

In another form of our invention, as disclosed in Figure 2, the test gas and the moisture containing gases may be emitted to dew chamber 12 by means of separate conduits 71 and 72 respectively. Liquid is emitted to the moisture containing gas in conduit 72 through conduit 74 and spray nozzle 75. The gas flow is regulated simultaneously with liquid flow through relay valves 76 and 77 respectively. These are opened by timer 78 through lines 80 and 81 and lines 82 and 83 respectively. Timer 78 is actuated by a relay 20 (not shown in Figure 2) in the same manner that timer 55 is actuated in the first application. Conduit 72 is sloped toward a drain tank 84 to drain any excess water from the spray.

The gas constitutent used in the moisture containing gas is generally air or the test gas. The latter is frequently used since a pump is eliminated which is necessary when air or another gas is employed. However, in the case of our preferred application as shown in Figure 1, this test gas must be under sufficient pressure to permit bubbling through liquid 46 in container 47.

The liquid employed is generally water because of its ready availability. However, condensible contaminants in some gases may not be dissolved by water. In those cases a liquid must be used in which the contaminants are soluble.

The accompanying description and drawing are utilized to show a particular form of our invention and not to define limiting qualities thereof.

We claim:
1. Apparatus for determining the dew point of a vapor containing test gas comprising, in combination: a mirror exposed to the test gas; means for cooling the mirror to the dew point of said gas to deposit condensed vapor thereon; means for detecting when said mirror is at the dew point temperature of said gas and measuring the temperature thereof; means for additionally depositing on said mirror more condensed vapor than is condensed in the measuring process; means for heating said mirror after said additional condensed vapor is deposited thereon; and timing means operatively connected to said depositing means and said heating means for controlling the length of times that additional vapor is deposited and said mirror is heated.

2. Apparatus according to claim 1 wherein the vapor in the test gas is water, and said additionally condensed vapor is deposited from a gas of higher dew point than the test gas.

3. Apparatus according to claim 2 wherein the gas of higher dew point comprises the test gas to which additional water vapor has been added.

4. Apparatus according to claim 2 wherein the gas of higher dew point comprises a source of gas separate from the test gas.

5. Apparatus according to claim 1 wherein said timing means comprises a high temperature switch to govern the maximum temperature to which said mirror is heated.

6. Apparatus according to claim 1 wherein said timing means comprises means to deposit a predetermined quantity of additional condensed vapor upon said mirror.

7. Apparatus for determining the dew point of a test gas comprising, in combination: a mirror exposed to the test gas; a light source directed at said mirror; a first photo tube receiving light reflected from said mirror; a second photo tube receiving light directly from said light source; an amplifier connected to said first and second photo tubes which amplifies the difference in their output; a relay actuated by said amplifier; a means for cooling said mirror; a means for detecting the temperature of said mirror; an instrument for recording the temperature detected by said detecting means; means for additionally supplying a gas of higher dew point than the test gas to the mirror; a valve for regulating the flow of said higher dew point gas; a first timer for controlling the length of time said valve admits the higher dew point gas to the mirror; means for supplying heat to said mirror; a second timer for controlling the length of time said mirror is heated and the aforesaid instrument controlling the temperature to which the mirror is heated; and means connecting said relay to said timers and said recording instrument so that when said mirror reaches the dew point of the test gas and vapor condenses on the mirror changing the reflectivity of the mirror and consequently the output from the photo tubes to the amplifier, and said amplifier actuates the relay, the relay will actuate the instrument to record the dew point temperature, actuate the first timer to admit the higher dew point gas after the measurement of dew point, and actuate the second timer to control the length of time said mirror will be heated to evaporate substantially all the condensed vapors and condensables from said mirror.

References Cited in the file of this patent
UNITED STATES PATENTS

| | | |
|---|---|---|
| Re. 23,287 | Friswold | Oct. 24, 1950 |
| 2,281,418 | Deaton | Apr. 28, 1942 |
| 2,415,776 | Walton | Feb. 11, 1947 |
| 2,435,895 | MacIlvaine | Feb. 10, 1948 |
| 2,455,966 | Ackley | Dec. 14, 1948 |
| 2,651,511 | Glover | Sept. 8, 1953 |
| 2,723,840 | Suhajda | Nov. 15, 1955 |